(12) United States Patent
Hattori et al.

(10) Patent No.: US 7,027,487 B2
(45) Date of Patent: Apr. 11, 2006

(54) COMBINATION POWER/INPHASE CORRELATOR FOR SPREAD SPECTRUM RECEIVER

(75) Inventors: Toshihiro Hattori, Okazaki (JP); Hideyuki Morita, Nishio (JP); Tatsuya Sato, Chiryu (JP)

(73) Assignee: Nippon Soken, Inc., Nishio (JP)

( * ) Notice: Subject to any disclaimer, the term of this patent is extended or adjusted under 35 U.S.C. 154(b) by 586 days.

(21) Appl. No.: 09/990,515

(22) Filed: Nov. 21, 2001

(65) Prior Publication Data

US 2002/0064214 A1 May 30, 2002

(30) Foreign Application Priority Data

Nov. 24, 2000 (JP) .............................. 2000-358189

(51) Int. Cl.
*H04K 1/00* (2006.01)

(52) U.S. Cl. ................... 375/147; 375/150; 370/342

(58) Field of Classification Search ................ 375/130, 375/147, 150, 343; 370/342, 335
See application file for complete search history.

(56) References Cited

U.S. PATENT DOCUMENTS 5,157,686 A * 10/1992 Omura et al. ............... 375/146
5,383,220 A 1/1995 Murai
5,548,613 A 8/1996 Kaku et al.
5,644,591 A 7/1997 Sutton
6,363,105 B1 3/2002 Sourour et al.
6,621,858 B1 9/2003 Sourour et al.

FOREIGN PATENT DOCUMENTS

JP 4-124925 4/1992

* cited by examiner

*Primary Examiner*—Temesghen Ghebretinsae
(74) *Attorney, Agent, or Firm*—Harness, Dickey & Pierce, PLC

(57) ABSTRACT

A correlator receives an inphase signal and a quadrature signal as incoming signals. In the correlator, a despreading circuit despreads the incoming signals using spreading codes. Further a complex conjugate multiplication circuit 60 multiplies the respective despread signals by the complex conjugate of pilot signals into synchronized signals. The synchronized signals corresponding to a predetermined number of symbols are averaged into average signals. Then the power of the average signals is calculated, and an auxiliary signal is generated by multiplying the power by a factor. On the other hand, the power of the despread signals is calculated, and the power corresponding to the predetermined number of symbols are averaged into an average power signal. The correlation output of the correlator is generated by adding the average power signal and the auxiliary signal. This correlator is immune to the frequency variation of its oscillator and noise.

2 Claims, 6 Drawing Sheets

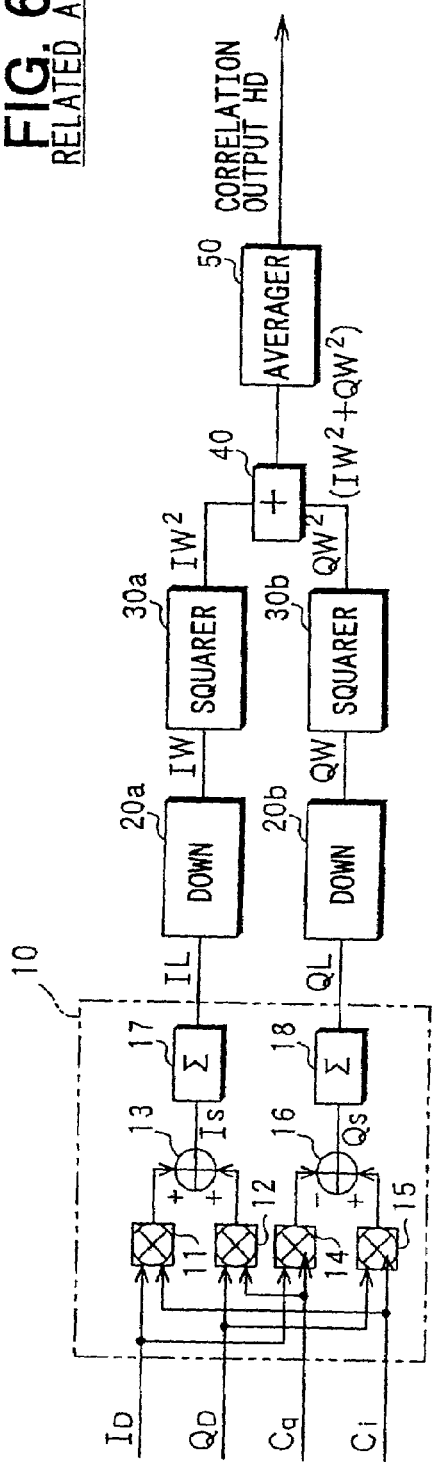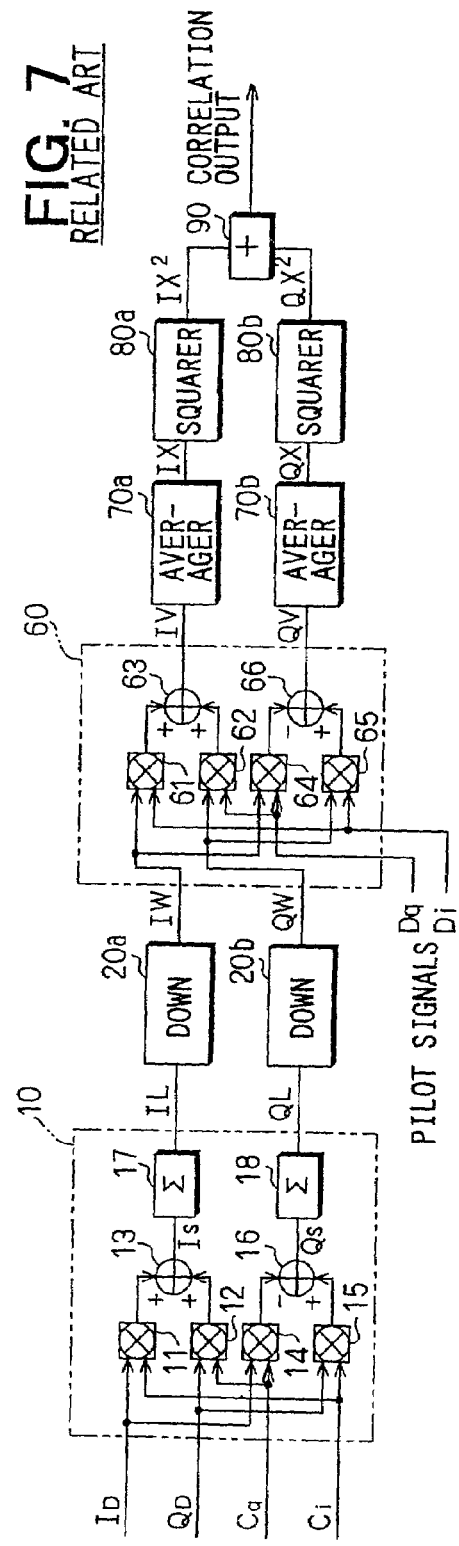

COMBINATION POWER/INPHASE CORRELATOR FOR SPREAD SPECTRUM RECEIVER

CROSS REFERENCE TO RELATED APPLICATION

The present application is based on and incorporates herein by reference Japanese Patent Application No. 2000-358189 filed on Nov. 24, 2000.

BACKGROUND OF THE INVENTION

1. Field of the Invention

The present invention relates to a correlator for a spread spectrum receiver.

2. Related Art

In some of communication systems employing CDMA (code division multiple access), a base station spreads an information signal and a pilot signal (known signal) over a wider bandwidth using spreading codes. The spreading codes include a first channelization code, a second channelization code, and scrambling codes. The information signal is spread using the first channelization code, and further spread using the scrambling codes into an inphase information signal and a quadrature information signal. The pilot signal is spread using the second channelization code, and further spread using the scrambling codes into an inphase pilot signal and a quadrature pilot signal.

The inphase information signal and the inphase pilot signal are combined, while the quadrature information signal and the quadrature pilot signal are combined. The combined inphase singal and the combined quadrature signal are modulated upon inphase carrier waves and quadrature-phase carrier waves, respectively. Thus the information signal and the pilot signal are multiplexed and transmitted as a quadrature-modulated transmission signal from the base station to a communications terminal.

The scrambling codes are assigned to each base station, while the first channelization code is assigned to each communications terminal. The pilot signal is substantially spread using only the scrambling codes, because the code whose value is invariably '1' is employed as the second channelization code. Therefore the communications terminal detects the scrambling codes from the signal received from the base station by utilizing the despread pilot signals, and then despreads the information signals using the detected scrambling codes.

The communications terminal includes a code detector for detecting the scrambling codes in its receiver portion. The code detector includes at least one correlator for correlating a received signal with candidates for the scrambling codes. The code detector identifies the scrambling codes, which the base station has used for spreading the signals, based on the output from the correlator. The communications terminal despreads the information signal using the detected scrambling codes.

A power correlator shown in FIG. 6 and an inphase correlator shown in FIG. 7 are proposed as the correlator incorporated in the code detector. The power correlator despreads received signals $I_D$, $Q_D$ using candidate codes Ci, Cq and generates a correlation output HD based on the power information $(IW^2+QW^2)$ of the despread signals IW, QW. The inphase correlator also despreads received signals $I_D$, $Q_D$ using candidate codes Ci, Cq and converts the despread signals IW, QW into synchronized despread signals IV, QV which are inphase with each other. The synchronized despread signals IV, QV corresponding to a predetermined number of symbols are averaged into average signals IX, QX respectively so that the noise components included therein are canceled each other. Then it generates the power information $(IX^2+QX^2)$ of the average signals IX, QX as a correlation output.

The communications terminal further includes an oscillator, a timing detection circuit, and an automatic frequency control (AFC) circuit. The timing detection circuit detects the phase of the oscillation of the oscillator of the base station immediately after the communications terminal is turned on. The oscillator of the communications terminal oscillates according to the detected phase so as to be synchronized with the oscillator of the base station. However, the frequency of the oscillator varies due to environmental variation (e.g., temperature variation). Therefore the AFC circuit controls the oscillator of the communications terminal so that the frequency variation is suppressed.

When the communications terminal is turned on, the timing detection circuit is first activated and thereafter the AFC circuit is activated. The communications terminal executes various processes according to the oscillation of the oscillator even before the AFC circuit is activated. The code detector should maintain a predetermined degree of precision of its correlation output even before the AFC circuit is activated.

In the inphase correlator shown in FIG. 7, the phase of the despread signals IW, QW may shift from one symbol to another due to the above frequency variation of the oscillator. Therefore the synchronized despread signals IV, QV corresponding to a symbol may cancel the synchronized despread signals IV, QV corresponding to another symbol, when the synchronized despread signals IV, QV corresponding to the predetermined number of symbols are averaged.

As a result, the correlation output $(IX^2+QX^2)$ may be much less than the actual correlation between the code candidate Ci, Cq and the received signals $I_D$, $Q_D$, and in some cases may be almost zero. That is, the precision of the correlation output of the inphase correlator is sometimes greatly deteriorated due to the frequency variation of the oscillator.

In contrast, the deterioration of the precision of the output signal due to the frequency variation of the oscillator is suppressed in the power correlator, because the amplitude $(IW^2+QW^2)^{1/2}$ of the despread signals IW, QW does not vary due to the frequency variation of the oscillator. However, the power correlator generates the correlation output HD using the despread signals IW, QW which may include noise components. Therefore the precision of the correlation output HD of the power correlator may be deteriorated when the noise components are relatively high.

SUMMARY OF THE INVENTION

It is an object of the present invention to provide a correlator which is used for a spread spectrum receiver and immune to both frequency variation of its oscillator and noise.

A correlator according to the present invention receives an inphase signal and a quadrature signal, and despreads them. Then the despread signals are converted to synchronized despread signals which are inphase with each other. The synchronized despread signals corresponding to a predetermined number of symbols are averaged into first average signals. First power information is calculated from the first average signals. On the other hand, second power information is calculated from the despread signals, and the second power information corresponding to the predetermined number of symbols are averaged into a second average signal. Finally, a correlation output of the correlator is calculated based on the first power information and the second average signal.

Preferably, an auxiliary signal is generated by multiplying one of the first power information and the second average signal by a factor. Then the correlation output is generated by adding the auxiliary signal and the other of the first power information and the second average signal.

BRIEF DESCRIPTION OF THE DRAWINGS

The above and other objects, features and advantages of the present invention will become more apparent from the following detailed description made with reference to the accompanying drawings. In the drawings

FIG. 6 is a block diagram showing a power correlator according to related art; and FIG. 7 is a block diagram showing an inphase correlator according to related art.

DETAILED DESCRIPTION OF THE PREFERRED EMBODIMENT

Figure 1:
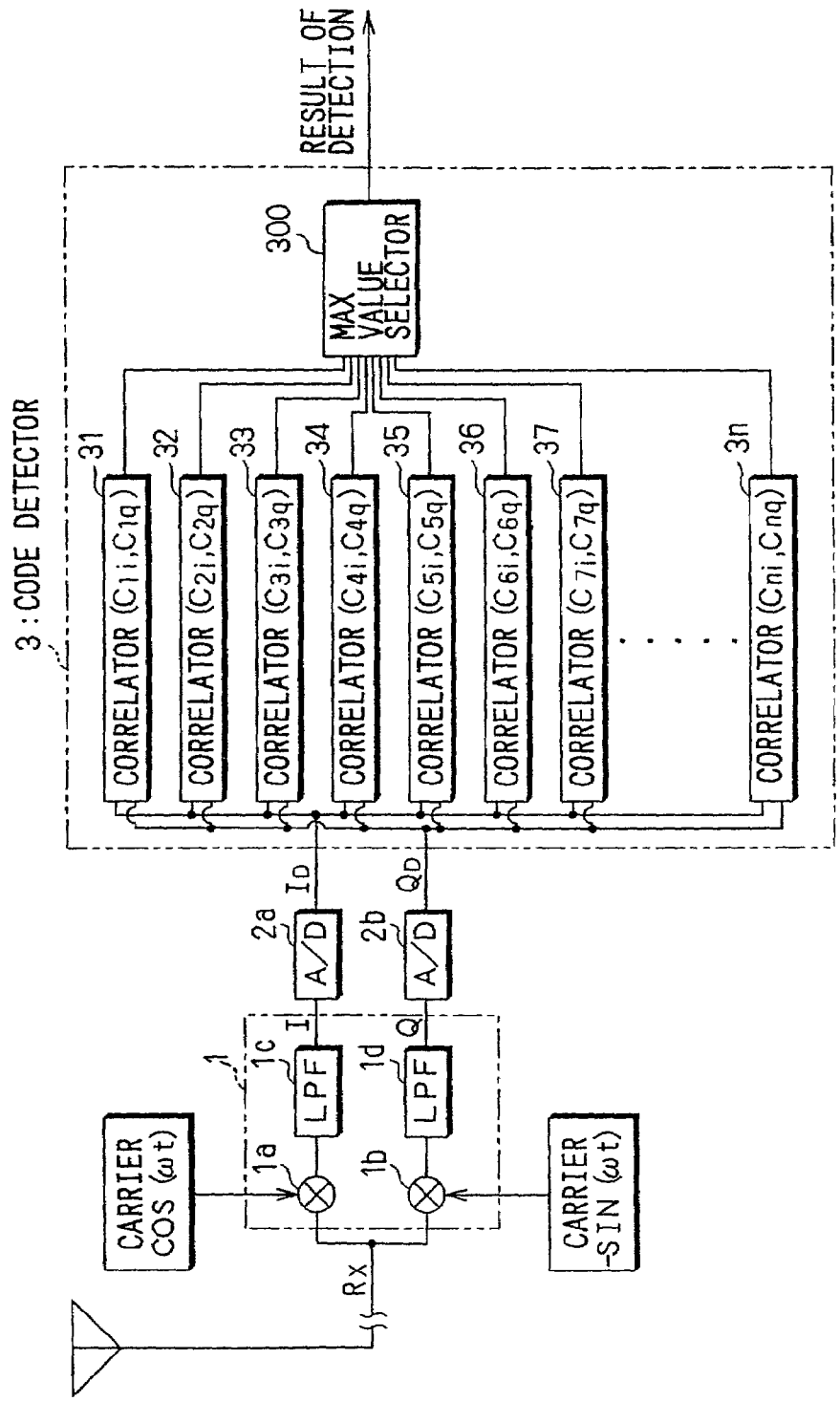
FIG. 1 is a block diagram showing a part of the receiver portion of a communications terminal in which a correlator according to an embodiment of the present invention is incorporated.

A combination power/inphase correlator according to an embodiment of the present invention is incorporated in the receiver portion of a CDMA communications terminal. Referring to FIG. 1, the receiver portion receives a signal Rx from a base station, and the received signal Rx is inputted to a quasi-synchronous detector 1.

The quasi-synchronous detector 1 includes two multipliers $1a$, $1b$ and two low-pass filters $1c$, $1d$. The first multiplier $1a$ multiplies the received signal Rx by a carrier wave 'COS($\omega t+\theta fc(t)$)', while the second multiplier $1b$ multiplies the received signal Rx by a carrier wave '-SIN($\omega t+\theta fc(t)$)' ('$\theta fc(t)$' is phase difference of the carrier waves between the transmitter portion of the base station and the receiver portion of the communications terminal). The high frequency components are removed from the output signals of the multipliers $1a$, $1b$ through the respective low-pass filters $1c$, $1d$.

Thus an inphase signal I and a quadrature signal Q are detected from the received signal Rx. A/D converters $2a$, $2b$ convert the inphase signal I and the quadrature signal Q into digital signals $I_D$, $Q_D$, respectively. The digital signals $I_D$, $Q_D$ are inputted to a code detector 3.

The code detector 3 detects the scrambling codes which the base station has used for spreading the signals. The code detector 3 includes a plurality of correlators 31, 32, 33, . . . , $3n$ according to the present embodiment and a maximum value selector 300. The correlators 31-$3n$ correspond to the respective candidates {(Cli, Clq), . . . ,(Cni,Cnq)} ('n' is a positive integer) for scrambling codes.

Each of the correlators 31-$3n$ outputs a signal representing correlation between the corresponding candidate codes Ci, Cq and digital signals $I_D$, $Q_D$. For example, the first correlator 31 outputs a signal representing correlation between the first candidate codes Cli, Clq and the digital signals $I_D$, $Q_D$, the second correlator 32 outputs a signal representing correlation between the second candidate codes C2i, C2q and the digital signals $I_D$, $Q_D$, and the nth correlator $3n$ outputs a signal representing correlation between the nth candidate codes Cni,Cnq and the digital signals $I_D$, $Q_D$.

The maximum value selector 300 stores all the candidate codes {(Cli, Clq), . . . , (Cni,Cnq)} beforehand. The maximum value selector 300 identifies the candidate codes corresponding to the maximum correlation output, and outputs a signal representing the ID (code number) of the identified candidate codes. Thus the scrambling codes which the base station has used for spreading the signals are detected, and the detected scrambling codes are used for despreading the information signal.

Figure 2:
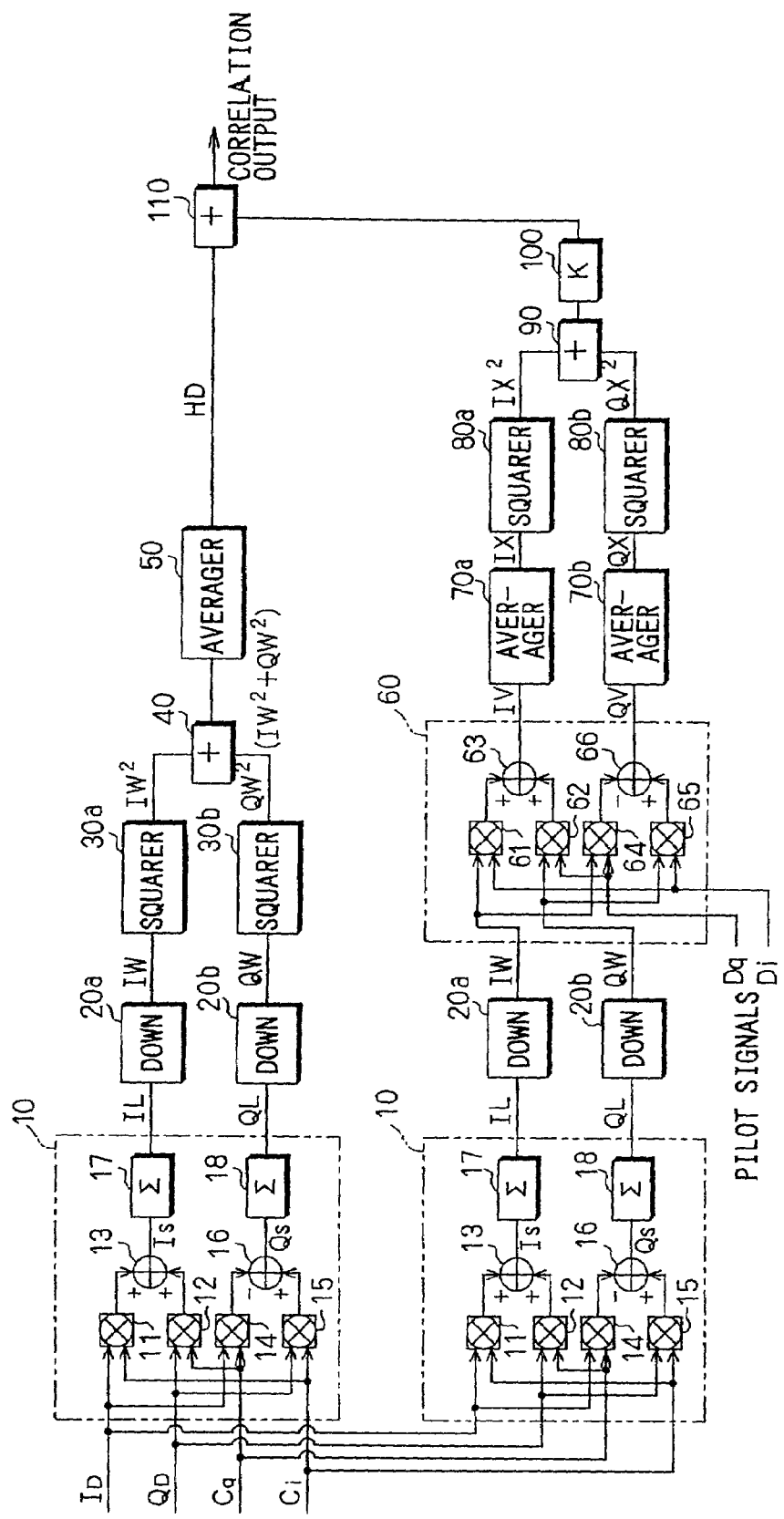
FIG. 2 is a block diagram showing the correlator according to the embodiment.

Referring to FIG. 2, each of the correlators 31-$3n$ according to the present invention includes a combination of a power correlator portion and an inphase correlator portion. The power correlator portion includes a despreading circuit 10, two downsamplers $20a$, $20b$, two squares $30a$, $30b$, an adder 40, and an averager 50. The despreading circuit 10 includes four multipliers 11, 12, 14, 15, two adders 13, 16, and two integrators 17, 18.

The despreading circuit 10 multiplies the digital signals $I_D$, $Q_D$ by the complex conjugate of the candidate codes (Ci, Cq) which are inphase with the signal transmitted by the base station. That is, the first multipliers 11, 12 and the first adder 13 together generate a real part signal Is ($=I_D \cdot Ci + Q_D \cdot Cq$), while the second multipliers 14, 15 and the second adder 16 together generate an imaginary part signal QS ($=Q_D \cdot Ci - I_D \cdot Cq$).

Further the integrators 17, 18 integrate the respective signals Is, Qs over the period of one symbol so that noise due to interference with signals of other channels is eliminated. As a result, the despreading circuit 10 outputs despread signals IL, QL. The first downsampler $20a$ downsamples the despread real part signal IL into an integral real part signal IW corresponding to every symbol. The second downsampler $20b$ downsamples the despread imaginary part signal QL into an integral imaginary part signal QW corresponding to every symbol.

These integral signals IW, QW correspond to demodulated pilot signal, and are adversely affected by fading, noise and the like during the transmission. The first squarer $30a$ squares the integral real part signal IW into a square real part signal $IW^2$ one after another. The second squarer $30b$ squares the integral imaginary part signal QW into a square imaginary part signal $QW^2$ one after another.

The third adder 40 adds the square signals $IW^2$, $QW^2$ into a power signal ($IW^2+QW^2$). The first averager 50 averages the power signal ($IW^2+QW^2$) corresponding to a predetermined number of symbols into a first average signal. The first average signal is outputted as the signal HD representing the correlation between the candidate codes Ci, Cq and the digital signals $I_D$, $Q_D$. That is, the power ($IW^2+QW^2$) of the integral signals IW, QW is calculated for every symbol over a predetermined period, and the average of the power ($IW^2+QW^2$) is outputted as the correlation output HD of the power correlator portion.

On the other hand, the inphase correlator portion includes a despreading circuit 10, two downsamplers $20a$, $20b$, a complex conjugate multiplication circuit 60, two averagers 70a, 70b, two squares 80a, 80b, and an adder 90. The despreading circuit 10 and the downsamplers 20a, 20b are the same as those of the power correlator portion. The complex conjugate multiplication circuit 60 includes four multipliers 61, 62, 64, 65, and two adders 63, 66.

The despreading circuit 10 and the downsamplers 20a, 20b operate similarly to the power correlator portion, and the integral signals IW, QW outputted from the downsamplers 20a, 20b are inputted to the complex conjugate multiplication circuit 60. The complex conjugate multiplication circuit 60 further receives the pilot signals Dq, Di, and multiplies the integral signals IW, QW by the complex conjugate of the pilot signals Dq, Di. That is, the third multipliers 61, 62 and the fourth adder 63 together generate a synchronized real part signal IV (=IW·Di+QW·Dq), while the fourth multipliers 64, 65 and the fifth adder 66 together generate a synchronized imaginary part signal QV (=QW·Di−IW·Dq).

The integral signals IW, QW correspond to the demodulated pilot signal as described above, and therefore the synchronized signals IV, QV generated by the complex conjugate multiplication circuit 60 are inphase with each other. That is, the complex conjugate multiplication circuit 60 converts the integral signals IW, QW (or the despread signals IL, QL) into the synchronized signals IV, QV which are inphase with each other. Specifically, on the I-Q coordinate plane, the synchronized signals (IV, QV) are on the part of the I-axis (real part axis) corresponding to the boundary between the first quadrant and the fourth quadrant. However, the phase of the synchronized signals IV, QV shifts from one symbol to another, because the signals IV, QV are adversely affected by the fading, noise, and phase shift during the transmission.

Accordingly, the second averager 70a averages the synchronized real part signal IV corresponding to the predetermined number of symbols into an average real part signal IX. Further the third averager 70b averages the synchronized imaginary part signal QV corresponding to the predetermined number of symbols into an averaged imaginary part signal QX. The noise components included in the synchronized signals IV, QV are canceled each other in the average signals IX, QX, because the phase of the noise shifts randomly from one symbol to anther.

The third squarer 80a squares the average real part signal IX into a square real part signal $IX^2$. The fourth squarer 80b squares the average imaginary part signal QX into a square imaginary part signal $QX^2$. The sixth adder 90 adds the square signals $IX^2$, $QX^2$ into a power signal $(IX^2+QX^2)$. The power signal $(IX^2+QX^2)$ is a correlation output of the inphase correlator portion.

The correlation output $(IX^2+QX^2)$ of the inphase correlator portion is inputted to the factor multiplier 100. The factor multiplier 100 multiplies the correlation output $(IX^2+QX^2)$ by a factor K, and outputs a resultant signal $K \cdot (IX^2+QX^2)$ as an auxiliary signal. The auxiliary signal $K \cdot (IX^2+QX^2)$ is inputted to the seventh adder 110. The seventh adder 110 further receives the correlation output HD of the power correlator portion, and adds the auxiliary signal $K \cdot (IX^2+QX^2)$ to the correlation output HD of the power correlator portion. The resultant signal $\{HD+K \cdot (IX^2+QX^2)\}$ is outputted from the seventh adder 100 as a composite correlation output of the present correlator.

In the inphase correlator portion, the deterioration of the precision of the output signal $(IX^2+QX^2)$ due to the noise components included in the synchronized signals IV, QV is suppressed by averaging the synchronized singles IV, QV. On the other hand, in the power correlator portion, the deterioration of the precision of the output signal HD due to frequency variation of the oscillator is suppressed, because the amplitude $(IW^2+QW^2)^{1/2}$ of the integral signals IW, QW does not vary due to the frequency variation of the oscillator.

The correlator according to the present embodiment is immune to the frequency variation of the oscillator and the noise, because it generates the composite correlation output by combining the correlation output $(IX^2+QX^2)$ from the inphase correlator portion and the correlation output HD from the power correlator portion. Accordingly, the scrambling codes can be accurately detected by using the present correlator.

Detection of the scrambling code using the power correlators, the inphase correlators, and the combination power/inphase correlators according to the present embodiment was simulated, respectively. The simulation was performed assuming that signals were not subjected to fading or Doppler shift but subjected to Gaussian noise during transmission. The noise characteristics Eb/No was assumed to be −4 db. Further the number of symbols accumulated for averaging at the averagers 70a, 70b, 50 was set to '10' (one slot), and the factor K was set to '1'.

Figure 3:
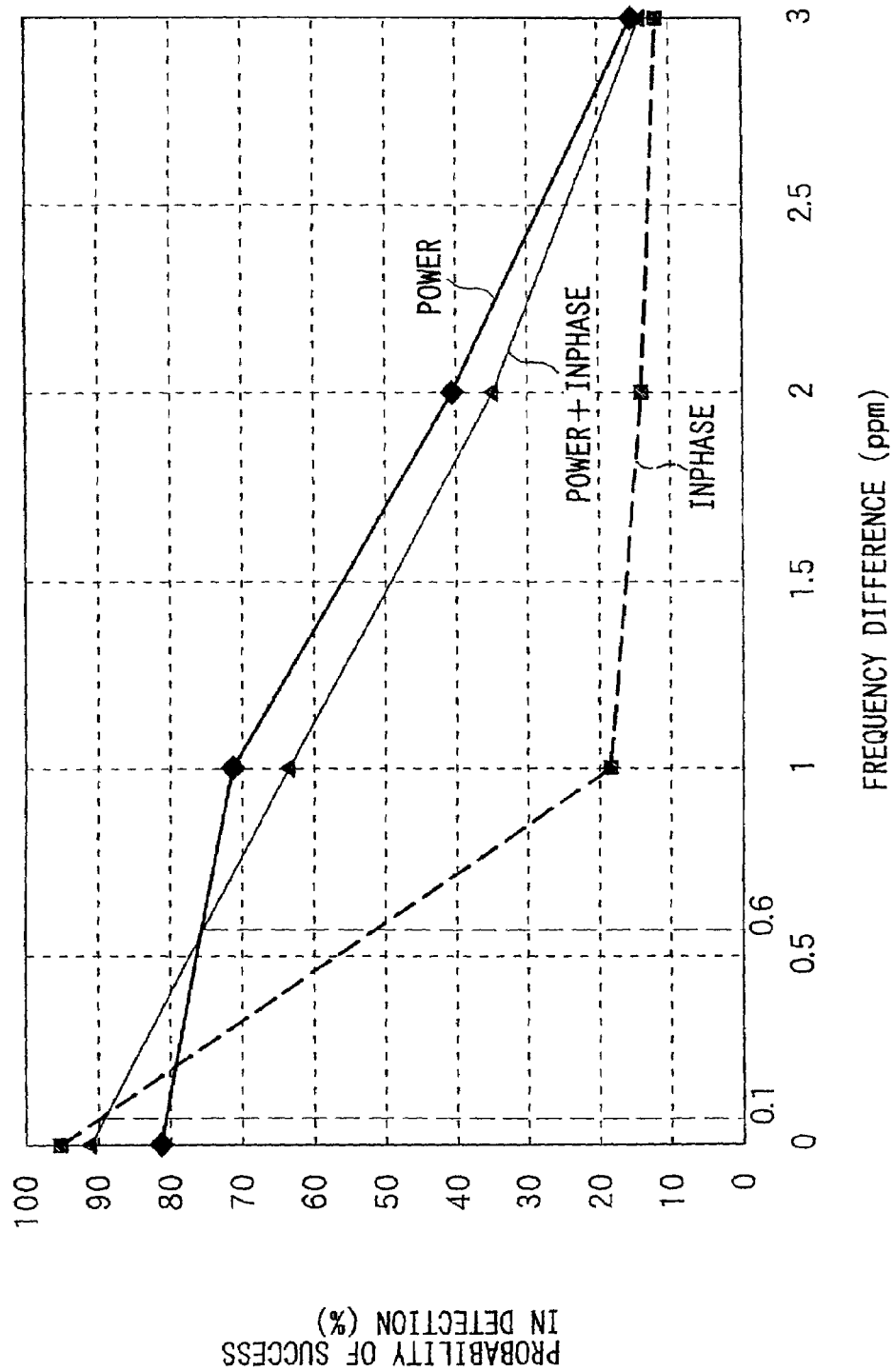
FIG. 3 is a graph showing the result of simulation of detection of scrambling codes using the correlators according to the embodiment and related art, respectively.

Static characteristics of the respective correlators were obtained as a result of the simulation, because the simulation was performed on the above assumption. FIG. 3 shows the result of the simulation. In FIG. 3, the horizontal axis corresponds to the difference between the frequency of the oscillator of the terminal and that of the base station. The vertical axis corresponds to the probability of success in the detection of the scrambling codes. As shown in FIG. 3, the probability of success in the detection of the scrambling code in the combination power/inphase correlator is higher than that in the power correlator and that in the inphase correlator, when the frequency difference is between 0.1 ppm and 0.6 ppm.

(Modifications)

Figure 4:
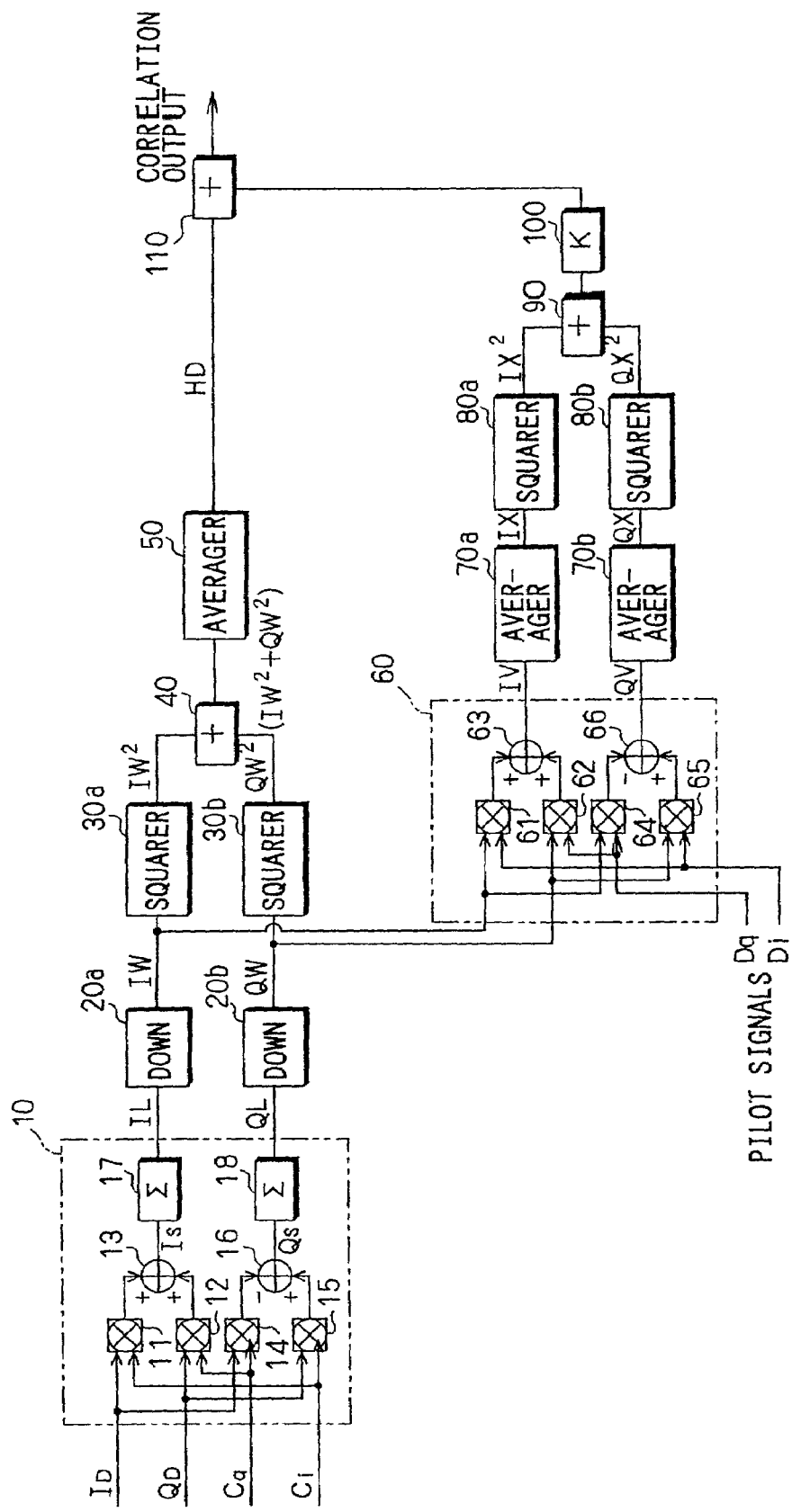
FIG. 4 is a block diagram showing a correlator according to a modification of the embodiment.

In the above embodiment, the downsamplers 20a, 20b included in the power correlator portion or the downsamplers 20a, 20b included in the inphase correlator portion may be eliminated. That is, the downsamplers 20a, 20b may be shared between the power correlator portion and the inphase correlator portion. Further, the despreading circuit 10 may be shared between the power correlator portion and the inphase correlator portion as shown in FIG. 4. Thus the construction of the correlator can be simplified.

Figure 5:
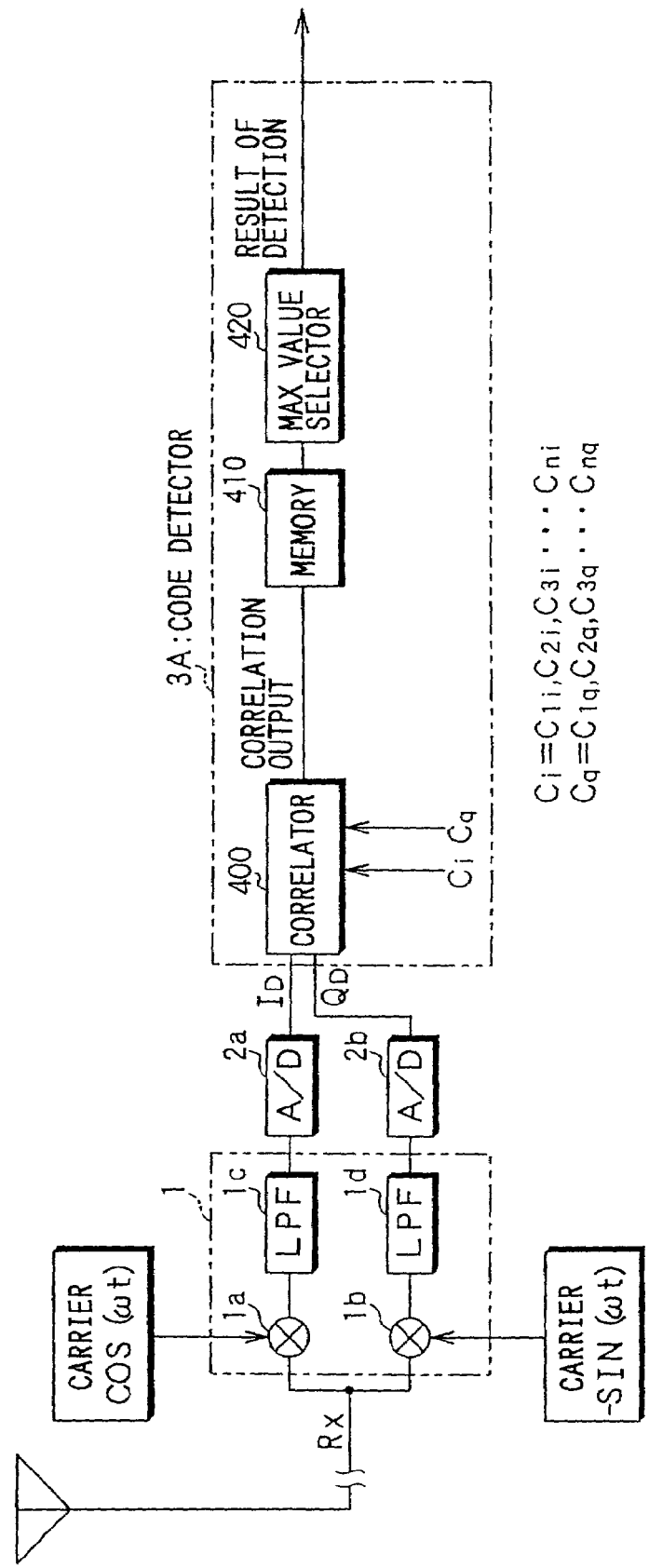
FIG. 5 is a block diagram showing a part of the receiver portion of a communications terminal in which the correlator of FIG. 2 is incorporated in a way other than FIG. 1.

In the above embodiment, as shown in FIG. 5, the receiver portion may employ another code detector 3A instead of the code detector 3 of FIG. 1. The code detector 3A includes only one correlator 400 according to the present invention. Each of the candidates $\{(C1i, C1q), \ldots, (Cni, Cnq)\}$ for the scrambling codes is inputted to the correlator 400 for a predetermined time, for exmample, the period of 10 symbols (one time slot). Thus the correlator 400 sequentially generates the correlation output for each of the candidate codes $\{(Cli, Clq), \ldots, (Cni, Cnq)\}$ using time-sharing.

The generated correlation outputs are sequentially stored in a memory 410. The maximum value selector 420 reads the correlation outputs from the memory 410, and identifies the candidate code corresponding to the maximum correlation output similarly to the maximum value selector 300 of FIG. 1. Then a signal representing the ID of the identified candidate code is outputted as a result of the code detection.

Further in the above embodiment, the power correlator portion may generate, as power information of the despread signals IL, QL, the amplitude $(IW^2+QW^2)^{1/2}$ of the integral signals IW, QW instead of the power signal $(IW^2+QW^2)$. In this case, the first averager 50 outputs the average of the amplitude $(IW^2+QW^2)^{1/2}$ as a correlation output HD. Further in this case, the sixth adder 90 should also generate the amplitude $(IX^2+QX^2)^{1/2}$ of the average signals IX, QX instead of the power signal $(IX^2+QX^2)$.

Moreover, the correlation output HD of the power correlator portion and the correlation output of the inphase correlator portion may be combined into the composite correlation output in a manner other than the above embodiment. For example, an auxiliary signal may be generated by multiplying the correlation output HD of the power correlator portion by a factor, and then a composite correlation output may be generated by adding the auxiliary signal to the correlation output $(IX^2+QX^2)$ of the inphase correlator portion.

The correlator according to the present invention may be incorporated in a device other than the CDMA communications terminal. For example, it may be incorporated in a W-CDMA communications terminal or a base station for detecting correlation between various signals.

What is claimed is:

1. A correlator for generating a correlation signal representing correlation between a received signal and spreading codes, comprising:
    despreading means for despreading an inphase component and a quadrature component of said received signal using said spreading codes into despread signals;
    conversion means for converting said despread signals into synchronized signals which are inphase with each other;
    first averager means for averaging said synchronized signals over a predetermined period into first average signals;
    first power calculation means for calculating first power information from said first average signals;
    second power calculation means for calculating second power information from said despread signals;
    second averager means for averaging said second power information over said predetermined period into second average signals;
    multiplication means for multiplying one of said first power information and said second average signal by a factor and outputting a result of the multiplication as an auxiliary signal; and
    addition means for adding said auxiliary signal and another of said first power information and said second average signal and outputting a result of the addition as said correlation signal.

2. A method for generating a composite correlation signal representing correlation between a first signal and a second signal, comprising
    generating a first correlation signal representing correlation between a first component of said first signal and a first component of said second signal at regular intervals over a predetermined period;
    generating a second correlation signal representing correlation between a second component of said first signal and a second component of said second signal at regular intervals over a predetermined period;
    converting said first and second correlation signals into synchronized signals which are inphase with each other;
    averaging said synchronized signals over said predetermined period into first and second average signals;
    calculating power of said first and second average signals into a first power signal;
    calculating power of said first and second correlation signals into a second power signal;
    averaging said second power signal over said predetermined period into a third average signal;
    multiplying one of said first power signal and said third average signal by a factor and generating a result of the multiplication as an auxiliary signal; and
    adding said auxiliary signal and another of said first power signal and said third average signal and outputting a result of the addition as said correlation signal.

* * * * *